US009961387B2

(12) United States Patent
Uhm et al.

(10) Patent No.: US 9,961,387 B2
(45) Date of Patent: May 1, 2018

(54) PROFILE-BASED CONTENT VARIATION

(71) Applicant: KT Corporation, Seongnam-si, Gyeonggi-do (KR)

(72) Inventors: Ik-chan Uhm, Incheon (KR); Soyoung Eom, Incheon (KR); Young-Hwan Yu, Seoul (KR); Kwan-yeol Lee, Asan-si (KR); Jungho Choi, Seongnam-si (KR)

(73) Assignee: KT Corporation, Seongnam-si, Gyeonggi-Do (KR)

( * ) Notice: Subject to any disclaimer, the term of this patent is extended or adjusted under 35 U.S.C. 154(b) by 0 days. days.

(21) Appl. No.: 14/876,938

(22) Filed: Oct. 7, 2015

(65) Prior Publication Data

US 2016/0100207 A1 Apr. 7, 2016

(30) Foreign Application Priority Data

Oct. 7, 2014 (KR) .................. 10-2014-0135260

(51) Int. Cl.
*H04N 7/16* (2011.01)
*H04H 60/33* (2008.01)
*H04N 21/2668* (2011.01)
*H04N 21/25* (2011.01)
*H04N 21/478* (2011.01)
*H04N 21/258* (2011.01)

(52) U.S. Cl.
CPC ....... *H04N 21/2668* (2013.01); *H04N 21/251* (2013.01); *H04N 21/252* (2013.01); *H04N 21/258* (2013.01); *H04N 21/25883* (2013.01); *H04N 21/25891* (2013.01); *H04N 21/47815* (2013.01)

(58) Field of Classification Search
CPC ............ H04N 21/2668; H04N 21/251; H04N 21/47815; H04N 21/25891; H04N 21/25883; H04N 21/252; H04N 21/258
See application file for complete search history.

(56) References Cited

U.S. PATENT DOCUMENTS 5,446,919 A * 8/1995 Wilkins ................. H04H 60/14
348/E7.063
2002/0188947 A1* 12/2002 Wang ................. H04N 5/44543
725/45

FOREIGN PATENT DOCUMENTS

| KR | 1020040017581 A | 2/2004 |
| KR | 1020070087383 A | 8/2007 |
| KR | 1020100027663 A | 3/2010 |
| KR | 1020130093351 A | 8/2013 |

\* cited by examiner

*Primary Examiner* — Oschta Montoya
(74) *Attorney, Agent, or Firm* — Brundidge & Stanger, P.C.

(57) ABSTRACT

Profile-based content variation includes determining viewing trends for a television viewing device based on subscriber information and a channel selection history of the television viewing device, matching commerce channels to at least one logical channel based on the determined viewing trends, and broadcasting one of the logical channels that matches one of the selected commerce channels.

18 Claims, 7 Drawing Sheets

PROFILE-BASED CONTENT VARIATION

TECHNICAL FIELD

The embodiments described herein pertain generally to providing targeted content from commerce-related media outlets to a subscriber, based on profile information for the subscriber.

BACKGROUND

With the continued growth of home shopping networks, traditional "brick and mortar" stores and shops have declined in popularity and, consequently, availability. However, viewers or subscribers to such home shopping networks have exchanged the convenience of location for being subjected to the broadcast preferences of the content provider.

SUMMARY

In one example embodiment, a method of providing profile-based content variation includes: determining viewing trends for a television viewing device based on subscriber information and a channel selection history of the television viewing device; matching one or more commerce channels with at least one logical channel based on the determined viewing trends; and broadcasting, to the television viewing device, one of the logical channels that matches one of the commerce channels that is selected based on information regarding matches between one or more of the commerce channels to one of the logical channels.

In another example embodiment, a commerce channel server includes: a viewing trend analyzer configured to determine viewing trends for a television viewing device based on subscriber information and channel selection history of the television viewing device; a matching information manager configured to match one or more commerce channels to at least one logical channel based on the determined viewing trends; and a channel broadcaster configured to broadcast, to the television viewing device, one of the logical channels that matches one of the commerce channels that is selected based on information regarding matches between one or more of the plurality of commerce channels to at least one logical channel.

In yet another example embodiment, a commerce channel system, includes a commerce channel server; and a television viewing device. The commerce channel server comprises: a viewing trend analyzer configured to determine viewing trends for a television viewing device based on subscriber information and channel selection history of the television viewing device, a matching information manager configured to match one or more of the plurality of commerce channels with at least one logical channel based on the determined viewing, and a channel broadcaster configured to broadcast, to the television viewing device, one of the at least one logical channel that is matched to one of the commerce channels that is selected based on information regarding matches between one or more of the plurality of commerce channels to at least one logical channel. The television viewing device comprises: an input receiver configured to input to select a commerce channel from among the plurality of commerce channels, a transmitter configured to transmit content for the selected commerce channel to the commerce channel server, and a channel receiver configured to receive, from the commerce channel server, at least one of the logical channels that matches with the selected commerce channel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
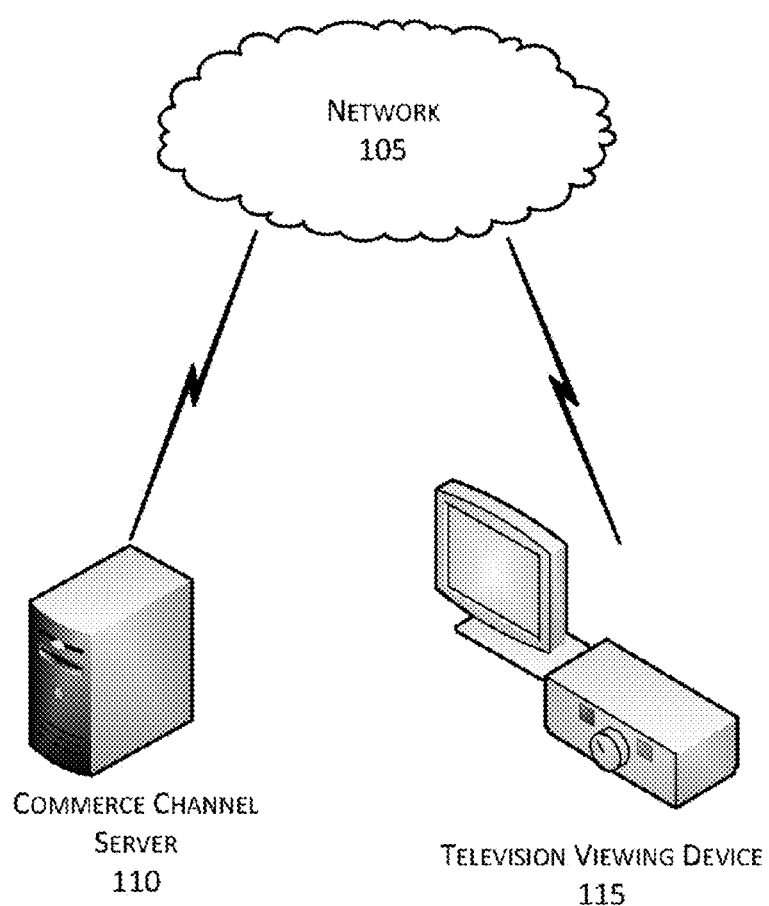
FIG. 1 shows an example system configuration in which profile-based content variation may be implemented, arranged in accordance with one or more embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

For the sake of consistency, the discussion of profile-based content variation hereafter may include references to "applications," "processes," and "operations," all of which may encompass any one of, at least, software programs, and applications, either singularly or in combination.

Described herein are systems, methods, apparatuses, applications, and/or programs by which commerce-related media outlets can transmit targeted content to a subscriber, based on profile information for the subscriber. Though not limiting, the embodiments of commerce-related media outlets are described in the context of one or more home shopping channels.

In accordance with the embodiments described herein, television viewing trends, including channel selection history, for a subscriber or subscribing household are recorded and analyzed. The viewing trends may include, but not be limited to, times of day during which commerce-related media is viewed by the subscriber or subscribing household; lengths of times in which commerce-related media is viewed by the subscriber or subscribing household; preferred channels, measured in terms of amounts of time accessed, lengths of time accessed, and/or by whom in a subscribing household preferred channels of commerce-related media are viewed. The viewing trends may be further attributed to a particular television viewing device, which may include, but not be limited to, a television, a television set-top box, a cable television receiver, a direct-to-satellite receiver, etc. Also recorded and utilized to provide profile-based content variation is a demographic profile of a subscriber or members of a subscribing household. The demographic profile may include, but by no means be limited to, age, gender, occupation, salary, marital status, parenting status, hobbies, etc. Such demographic information may be gathered and stored any time after which the subscriber or subscribing household subscribes to at least television services provided by a media content provider. Such media content may include, but not be limited to, television content, internet services, and/or cellular telephone services.

Based on the recorded commerce-related media viewing trends, including channel selection history, as well as the profile(s) for a particular subscriber or subscribing household, a commerce channel server may be able to target a particular home shopping channel, selected based on a preferred demographic, to a television viewing device corresponding to the subscriber or subscribing household. Further, a logical channel number, or virtual channel, may be selected to broadcast the targeted home shopping channel to the aforementioned television viewing device.

That is, since there are limited channel resources by which home shopping networks broadcast, the embodiments described herein are intended to implement, e.g., efficient utilization of broadcasting resources. Accordingly, subscribers or subscribing households may receive defaults commerce related content, e.g., home shopping channels, or even recommendations thereof that are likely to be of interest.

FIG. 1 shows an example system configuration in which profile-based content variation may be implemented, arranged in accordance with one or more embodiments described herein. As depicted, configuration 100 includes, at least, a network 105; a commerce channel server 110, and a television viewing device 115.

Network 105 may include, but not be limited to, a broadcast network for television programming. Such broadcasting may be implemented utilizing radio-wave transmissions for video signals, cable television network, e.g., coaxial cables, direct-broadcast satellite network, etc., utilized for broadcasting electronic media to public or subscription based audiences. Thus, network 105 may additionally or alternatively include a computer network, the Internet, a telephone network, a TCT/IP data network (wide area networks, metropolitan area networks, local area networks, campus area networks, virtual private networks), and any other processing and/or computing devices capable of providing at least server-to-client communications.

Network 105 may be configured to facilitate the broadcast of virtual channels, or logical channels, which may be regarded as channel numbers that can be entered digitally (e.g., via remote control), remapped from H.222 Program Association Tables and Program Mapping Tables.

Virtual channels, or logical channel numbers, may be utilized to group multiple channels based on content, origin, or even for localizing advertisements to a particular commerce-related media market. Without the intent of implying limitations, reference will be made hereafter to virtual channels, though logical channel numbers may be alternately utilized, unless a distinction is made necessary.

Commerce channel server 110 may be a computing device configured, programmed, and/or designed to receive and/or store commerce-related media content, e.g., for one or more home shopping networks, and direct or target the broadcast of such content over network 105 to one or more embodiments of television viewing device 115. Commerce channel server 110 may target or direct the broadcast of commerce-related media content to television viewing device 115 based on, at least, viewing trends for a corresponding subscriber or subscribing household and/or at least portions of a demographic profile of the subscriber or members of the subscribing household. As implemented by a commerce-related media content source, e.g., Internet-service provider, free-air television provider, cable television provider, or satellite television provider, commerce channel server 110 may be configured as, as examples only, an application server, a standalone server, a web server, and any other devices being capable of, at least, receiving data analog and/or digital media content, classifying or categorizing the received media content, and transmitting or broadcasting particular classifications or categories of the media content to particular ones of television viewing devices 115 based on respectively corresponding viewing trends and/or subscriber-based profile demographics.

Commerce channel server 110 may be configured, programmed, and/or designed to gather, receive, and/or store data pertaining to viewing trends for television viewing device 115 based on corresponding subscriber information and channel selection history; analyze the viewing trend data; match one or more of a plurality of commerce-related media channels to at least one logical channel based on the determined viewing trends; and transmit and/or broadcast, to television viewing device 115, at least one logical channel that matches one of the commerce channels that is selected based on information regarding matches between the commerce channels to at least one logical channel.

Additionally, or alternatively, commerce channel server 110 may be configured, programmed, and/or designed to transmit categories of the commerce-related media content channels to television viewing device 115, and/or transmit information regarding matches between one or more of the commerce channels with at least one logical channel to television viewing device 115.

Television viewing device 115 may refer to an electronic device that is configured to receive analog and/or digital media content from commerce-channel server 110 over network 105, as described below. Television viewing device 115 may also be implemented as a television set-top box, a smart TV, a personal computer, a tablet computing device, or a laptop computer. Additionally or alternatively, television viewing device 115 may be implemented as a portion of a small-form factor portable (or mobile) electronic device such as a mobile phone, cell phone, smartphone, personal data assistant (PDA), a personal media player device, an application specific device, or a hybrid device that include any of the above functions.

Television viewing device 115 may also be configured, programmed, and/or designed to select a commerce-related media channel from among multiple ones transmitted or broadcast from commerce channel server 110, transmit a request for a selected commerce-related media content channel to commerce channel server 110, and/or receive, from commerce channel server 110, at least one logical channel that matches the selected commerce-related media content channel.

Figure 2:
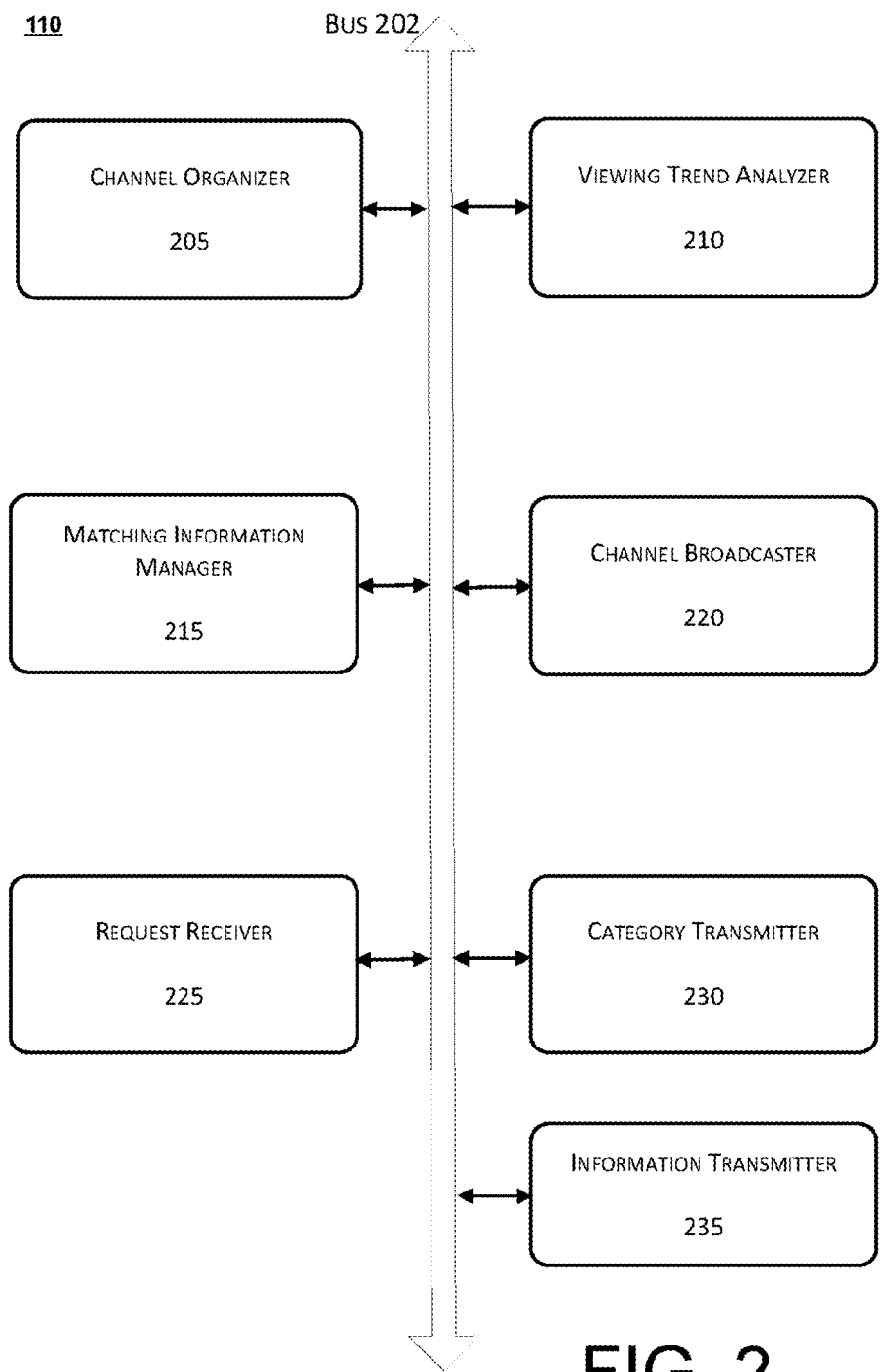
FIG. 2 shows an example configuration of a commerce channel server by which at least portions of profile-based content variation may be implemented, arranged in accordance with one or more embodiments described herein.

FIG. 2 shows an example configuration of commerce channel server 110, by which at least portions of profile-based content variation may be implemented. Commerce channel server 110 may be hosted and implemented, at least in part, by a commerce-related media content source, e.g., Internet-service provider, free-air television provider, cable television provider, or satellite television provider. Commerce channel server 110 may include, but not be limited to, channel organizer 205, viewing trend analyzer 210, matching information manager 215, channel broadcaster 220, request receiver 225, category transmitter 230, and information transmitter 235. These components may be implemented in a computing environment relative to commerce channel server 110, and may be stored in a corresponding memory storage device. By way of example, commerce channel server 110, which may alternatively be implemented as a programmable application, may reside on a memory device of a server or combination of servers. For purposes of illustration, the application or program, including executable program components, are illustrated herein as discrete blocks, although it is recognized that such programs and components reside at various times in different storage components of the corresponding client device, and may be executed by at least one data processor of the computer.

Channel organizer 205 may refer to a module or component that is designed, programmed, and/or configured to, e.g., to serve as a variable channel component that organizes or associates virtual, or numbered logical channels, to an original channel number used under analog broadcasts for commerce channel server 110. The virtual, or logical, channels may be organized based on subject matter. For example, with reference to the data flow depicted in FIG. 3, described further herein, channel organizer 205 may assign commerce-related media content programming for baby goods to virtual channel A1 310A; commerce programming for sporting goods to virtual channel A2 310B; commerce programming for home supplies to virtual channel A3 310C; and commerce programming for garden supplies to virtual channel A4 310D.

As referenced herein, commerce programming may include streaming content or sharing of files, of any format, that may be streamed or transmitted via network 105. Such programming may include, but not be limited to, commerce-related television content, both one-time events and episodic series. Further, commerce channel server 110 may be hosted and/or implemented by a media content service provider that provides subscribers or one-off customers with commerce-related media content, e.g., home shopping network programming. Such content may be provided for free or for a subscription fee.

Viewing trend pattern analyzer 210 may refer to a module or component that is designed, programmed, and/or configured to gather, receive, and/or store data pertaining to viewing trends for television viewing device 115 based on corresponding subscriber information and channel selection history; analyze such data and determine viewing trends for television viewing device 115. Accordingly, viewing trend pattern analyzer 210 may detect, for respective embodiments of television viewing device 115, viewing trends that may include, but not be limited to, times of day during which television viewing device 115 is powered on, and to which channels including, but not necessarily limited to, channels having commerce-related media programming; lengths of times for which television viewing device 115 is powered on, and to which channels; preferred channels, measured in terms of amounts of time accessed, lengths of time accessed, and/or by whom in a subscribing household the preferred channels are viewed. In addition to attributing the viewing trends to television viewing device 115, which may include, but not be limited to, a television, a television set-top box, a cable television receiver, a direct-to-satellite receiver, etc., the recorded viewing trends may be attributed to a subscriber or members of a subscribing household corresponding to television viewing device 115. Such attribution to particular members of a subscribing household may be implemented on a general level, based on a demographic profile registered with a service provider; or, in addition or alternatively, as a viewer enters an identifier on, e.g., a remote control or is otherwise recognized by television viewing device 115.

As a simple example, viewing trend analyzer 210 may detect a subscriber corresponding to television viewing device 115 regularly spending time on weekday mornings viewing a channel that broadcasts home shopping network programming for baby products. Cross-referencing such viewing trend information with previously received subscriber information that the subscribing household includes a 30-year-old husband and wife, viewing trend analyzer 210 may determine that corresponding television viewing device 115 should, by default or by suggestion, receive commerce-related content from a virtual channel or numbered logical channel that specializes in baby goods or sporting goods, befitting a healthy lifestyle for the demographics for the subscribing household.

Further, viewing trend analyzer 210 may periodically update such preferences, tendencies, and characteristics to account for the passage of time, occurrence of life events (e.g., births, birthdays, anniversaries, deaths, etc.). Such periodic updates may occur monthly, seasonally, annually, etc.

Matching information manager 215 may refer to a module or component that is designed, programmed, and/or configured to match one or more of a plurality of virtual or logical channel numbers corresponding to a commerce-related content channel, e.g., home shopping network, to a respective television viewing device, based on subscriber information and/or the recorded channel selection history. Accordingly, matching information manager 215 may be designed, programmed, and/or configured to match the subject matter of a particular commerce-related content, e.g., a sports-themed home shopping channel, which may be broadcast on any one of multiple virtual channels or logical channel numbers, to a prioritized demographic for a subscriber corresponding to television viewing device 115. The matching may be regarded as mapping targeted home shopping content to an identified demographic, based on profile information and/or viewing trends.

As referenced above, virtual channels or logical channel numbers may be utilized to group multiple channels based on content, origin, or even for localizing advertisements to a particular market. For example, the assignment of virtual channels in the United States is defined within the stream via terrestrial or cable versions of a "Virtual Channel Table" as outlined by ATSC document "A/65", Annex B. Rules for assignment of major channel numbers are as follows:

Existing analog stations were assigned a major channel number matching their existing analog number;

New digital stations assigned to a channel whose matching major channel number is not in use must use that number; and New digital stations assigned to a channel whose matching major channel number is in use (by a former analog station) reciprocate, using the major channel number that matches the actual channel of the station in question.

Channel broadcaster 220 may refer to a module or component that is designed, programmed, and/or configured to transmit or broadcast the programming content corresponding to the matched virtual channel or logical channel number from commerce channel server 110 to television viewing device 115, via network 105.

Request receiver 225 may refer to a module or component that is designed, programmed, and/or configured to receive requests, from television viewing device 115, for a listing of virtual channels and/or logical channel numbers for one or more commerce-related content channels, e.g., home shopping networks. Such requests may include, e.g., a listing of categories of commerce channels, a listing of virtual channels and/or logical channel numbers corresponding to respective commerce-related content channel categories, a listing of categories of virtual channels and/or logical channel numbers, etc.

Category transmitter 230 may refer to a module or component that is designed, programmed, and/or configured to transmit or broadcast, to a requesting embodiment of television viewing device 115, a requested listing of categories of commerce channels, virtual channels, logical channel numbers, etc., in response to a request received by request receiver 225.

Information transmitter 235 may refer to a module or component that is designed, programmed, and/or configured to transmit or broadcast, from commerce channel server 110 to television viewing device 115 via network 105, information regarding matches between a commerce-related content channel, e.g., home shopping network, and corresponding virtual channels and/or logical channel numbers. That is, information transmitter 235 may transmit, to television viewing device 115, matches between respective virtual channels and/or logical channel numbers that match with a prioritized demographic and/or a recorded viewing trend of a subscriber or subscriber family that correspond to television viewing device 115.

Figure 3:
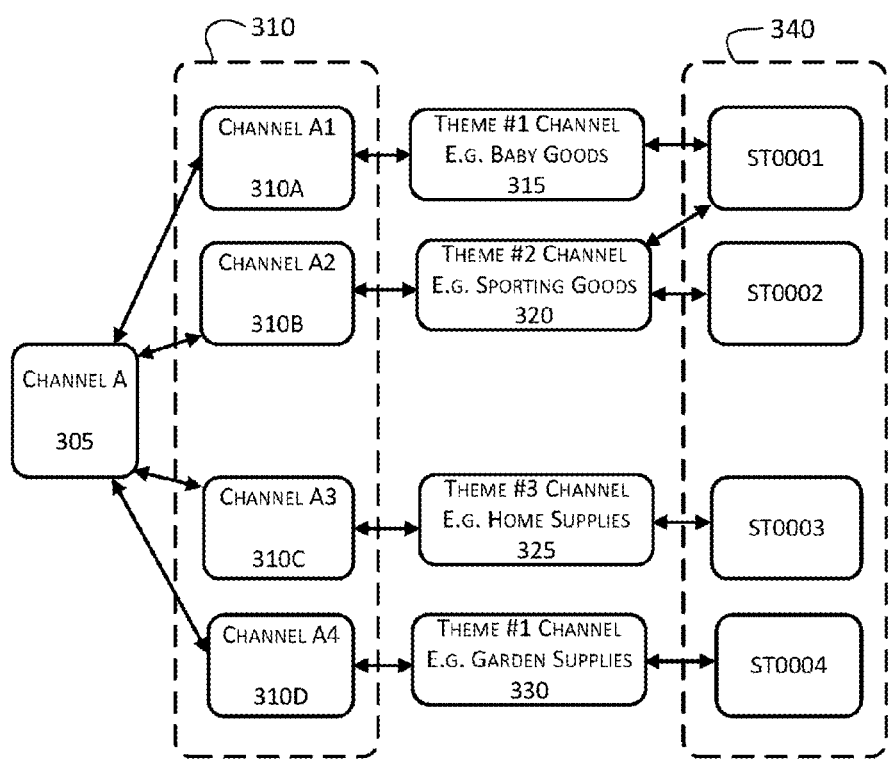
FIG. 3 shows an example depiction of a flow of data in accordance with at least one implementation of profile-based content variation may be implemented, as described herein.

FIG. 3 shows an example depiction of a flow of data in accordance with at least one implementation of profile-based content variation may be implemented, as described herein. Data flow 300 may be implemented by any of the embodiments, or components thereof, referenced previously regarding the system in FIG. 1 and apparatus of FIG. 2.

Data flow 300 may be implemented as the flow of commerce channel content, e.g., home shopping network programming, virtual channel or logical channel number listings, etc., broadcast or transmitted from commerce channel server 110 to television viewing device 115 via network 105.

Channel A 305 may represent a commerce channel, e.g., home shopping network, having multiple, e.g., 1-N, virtual channels or logical channel numbers, by which commerce channel content may be broadcast or transmitted to subscribers.

Block 310 may represent a compilation of 1-N virtual channels or numbered logical channels from which separate commerce-related content may be broadcast or transmitted from Channel A 305 on commerce channel server 110. As examples only, and not in any way intended to be limiting in quantity or in terms of subject matter, block 310 is depicted as including virtual channels, or numbered logical channels, Channel A1 310A, Channel A2 310B, Channel A3 310C, and Channel A4 310D. The virtual channels, or numbered logical channels, correspond respectively to Baby Goods 315, Sporting Goods 320, Home Supplies 325, and Garden Supplies 330.

The respective virtual channels of block 310 are channels displayed on digital television tuners corresponding to television viewing device 115 that are different than channel A 305, on which the corresponding signal is digitally broadcast over network 105. The corresponding channel number is displayed through a process called Program and Station Information Protocol (PSIP) and is the original channel number the station used under analog broadcasts. When the respective virtual channel or logical channel number is entered into a digital tuner, it is displayed as the virtual channel automatically.

Block 340 may represent various embodiments of television viewing device 115. The respective embodiments of television viewing device are illustrated as being represented by example identifiers, used by commerce channel server 110 to transmit or broadcast targeted content. As set forth above, the respective embodiments of television viewing device 115 may include, but not be limited to, a television, a television set-top box, a cable television receiver, a direct-to-satellite receiver, etc. Accordingly, as examples only, block 340 may include examples of set-top boxes, e.g., receivers for cable, satellite, or even Internet television signals, respectively identified as ST0001, ST0002, ST0003, and ST0004.

As depicted, channel A 305, which may be hosted on a memory or streamed by a processor of commerce channel server 110, may transmit or broadcast programming content corresponding to the respective virtual channels or numbered logical channels of block 310 to the respective embodiments of television viewing device 115 of block 340, via network 105.

As set forth previously in the description of FIG. 2, if it is detected that a subscriber corresponding to television viewing device 115 regularly spends time on weekday mornings viewing a home shopping network that sells baby products, such viewing trend information may be cross-referenced with previously received subscriber information that, e.g., the subscribing household includes a 30-year-old husband and wife. It may then be determined that television viewing device 115, identified as ST0001, should, by default, receive commerce-related content from Channel A1 310A that specializes in baby goods and/or Channel A2 310B that specializes in sporting goods, befitting a healthy lifestyle for the demographics for the subscribing household.

Figure 4:
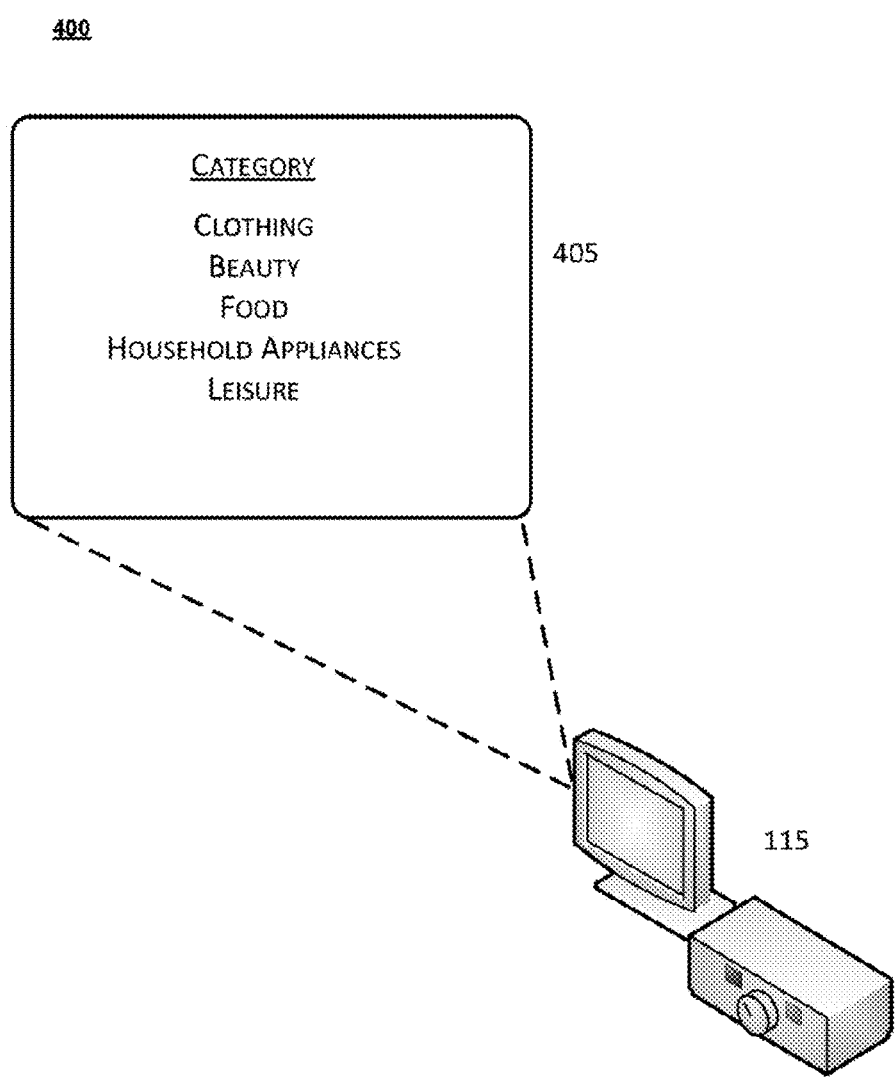
FIG. 4 shows an example block depiction of a user interface (UI) showing categories of variable content, arranged in accordance with one or more embodiments of profile-based content variation described herein.

FIG. 4 shows an example block depiction of a user interface (UI) showing categories of variable content, arranged in accordance with one or more embodiments of profile-based content variation described herein.

Block 405 may represent a UI that shows, among other features, a listing of categories of commerce channels, a listing of virtual channels and/or logical channel numbers corresponding to respective commerce channel categories, a listing of categories of virtual channels and/or logical channel numbers, etc. The listing of categories of commerce channels, virtual channels, logical channel numbers, etc., may be transmitted or broadcast to a requesting embodiment of television viewing device 115 in response to a request received by request receiver 225.

Figure 5:
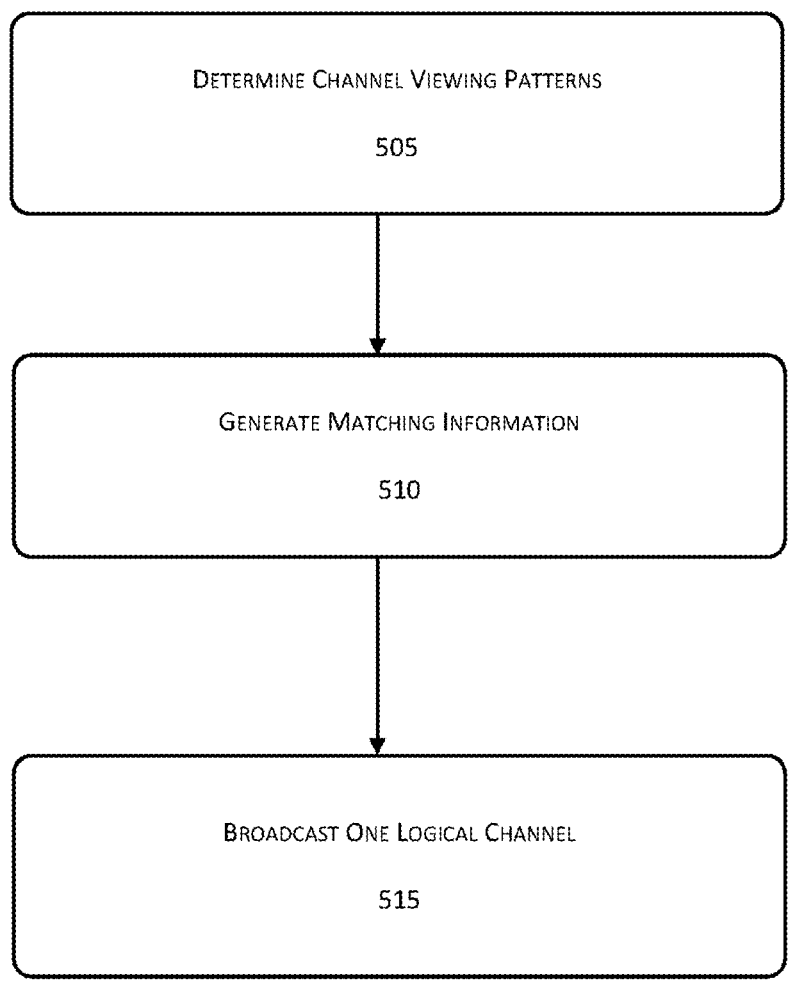
FIG. 5 shows an example processing flow of operations for implementing at least portions of profile-based content variation, arranged in accordance with one or more embodiments described herein.

FIG. 5 shows an example processing flow of operations 500 for implementing at least portions of profile-based content variation, arranged in accordance with one or more embodiments described herein. Process 500 may be implemented by any of the embodiments, components thereof, or data flow referenced previously regarding FIGS. 1-3. According to the description of the operations in FIG. 5, any of the operations depicted and described herein may be implemented as computer-readable instructions stored on a computer-readable medium. The computer-readable instructions may, for example, be executed by a processor of any one of commerce channel commerce channel server 110 and/or television viewing device 115, as referenced herein, having a network element and/or any other device corresponding thereto, particularly as applicable to the applications and/or programs described above corresponding to the configuration 100 for profile-based content variation. Further, example process 500 may include one or more operations, actions, or functions as illustrated by one or more blocks 505, 510, and 515. Although illustrated as discrete blocks, various blocks may be divided into additional blocks, combined into fewer blocks, or eliminated, depending on the desired implementation. Processing may begin at block 505.

Block 505 (Determine Channel Viewing Patterns) may refer to viewing trend analyzer 210 receiving, retrieving, and/or storing objective data regarding viewing habits for a subscriber or subscribing household corresponding to an embodiment of television viewing device 115; and then analyzing such data for the purpose of implementing profile-based content variation, i.e., providing variable commerce-related media channel content. More particularly, block 505 may include viewing trend analyzer 210 analyzing the aforementioned objective data to determine viewing trends that may include, but not be limited to, usual times of day during which television viewing device 115 is powered on, and to which channels including, but not limited to, commerce-related content channels; lengths of times for which television viewing device 115 is powered on, and to which channels; preferred channels, measured in terms of amounts of time accessed, lengths of time accessed, and/or by whom in a subscribing household the preferred channels are viewed. Such trends may be determined based on averages or threshold values utilized in known statistical analysis of television and/or online viewing habits. In addition to attributing the viewing trends to television viewing device 115, which may include, but not be limited to, a television, a television set-top box, a cable television receiver, a direct-to-satellite receiver, etc., the recorded viewing trends determined at block 505 may be attributed to a subscriber or members of a subscribing household corresponding to television viewing device 115. Block 505 may be followed by block 510.

Block 510 (Generate Matching Information) may refer to matching information manager 215 matching the determined viewing patterns attributable to a subscriber or subscribing household corresponding to television viewing device 115 to one or more of a plurality of virtual or logical channel numbers corresponding to a commerce channel, e.g., home shopping network. Accordingly, block 510 may include matching information manager 215 matching the subject matter of a particular commerce-related content channel, e.g., a sports-themed home shopping channel, which may be broadcast on any one of multiple virtual channels or logical channel numbers, to a prioritized demographic for a subscriber or subscribing household corresponding to television viewing device 115. Thus, the operation at block 510 may be regarded as mapping targeted home shopping content to an identified demographic, based on profile information and/or viewing trends. Block 510 may be followed by block 515.

Block 515 (Broadcast One Logical Channel) may refer to channel broadcaster 220 transmitting or broadcasting programming content corresponding to the matched virtual channel or logical channel number from commerce channel server 110 to television viewing device 115, via network 105.

Figure 6:
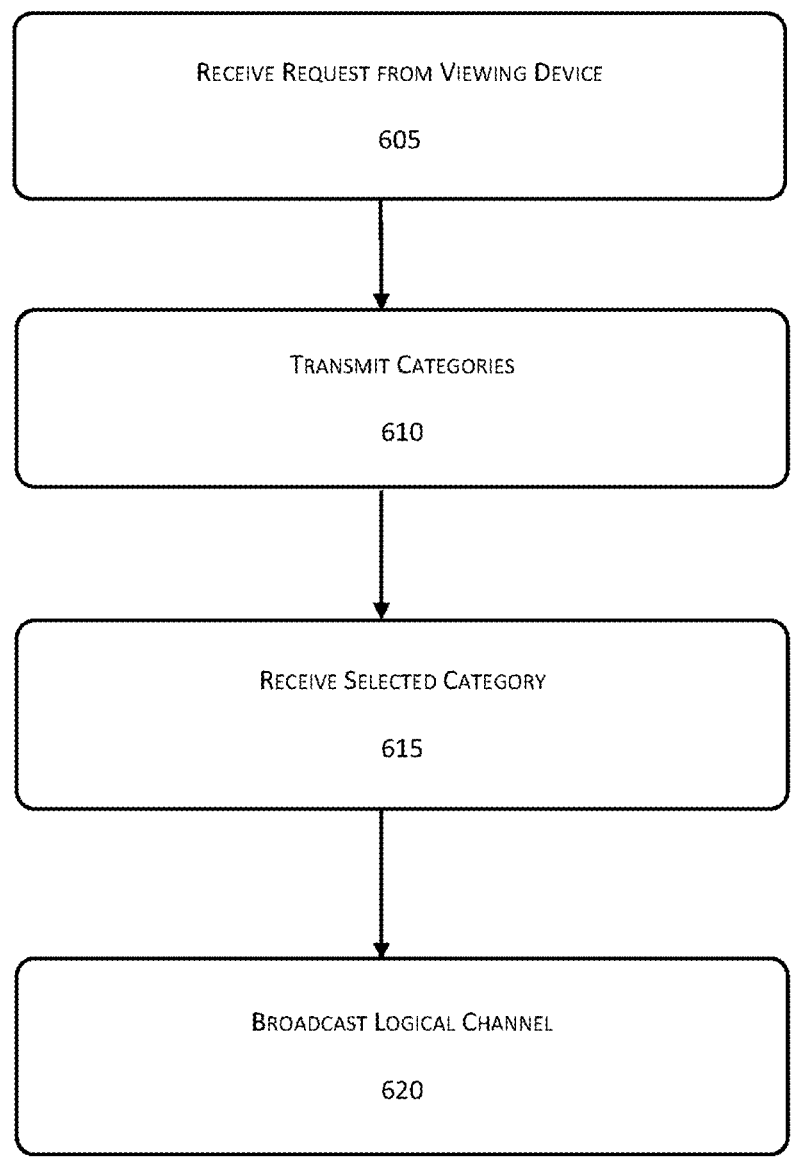
FIG. 6 shows another example processing flow of operations for implementing at least portions of profile-based content variation, arranged in accordance with one or more embodiments described herein.

FIG. 6 shows another example processing flow of operations 600 for implementing at least portions of profile-based content variation, arranged in accordance with one or more embodiments described herein. Process 600 may be implemented by any of the embodiments, components thereof, or data flow referenced previously regarding FIGS. 1-3, and may be regarded as an extension or even alternative to the processing flow of operations depicted and described with regard to FIG. 5. According to the description of the operations in FIG. 6, any of the operations depicted and described herein may be implemented as computer-readable instructions stored on a computer-readable medium. The computer-readable instructions may, for example, be executed by a processor of any one of commerce channel commerce channel server 110 and/or television viewing device 115, as referenced herein, having a network element and/or any other device corresponding thereto, particularly as applicable to the applications and/or programs described above corresponding to the configuration 100 for profile-based content variation. Further, example process 500 may include one or more operations, actions, or functions as illustrated by one or more blocks 605, 610, 615, and 620. Although illustrated as discrete blocks, various blocks may be divided into additional blocks, combined into fewer blocks, or eliminated, depending on the desired implementation. Processing may begin at block 605.

Block 605 (Receive Request from Viewing Device) may refer to request receiver 225 receiving requests, from television viewing device 115, for a listing of virtual channels and/or logical channel numbers for one or more commerce channels, e.g., home shopping networks. Such request may be automated, generated and sent by television viewing device 115; or, additionally or alternatively, such request may be generated and entered by a subscriber or member of the subscribing household corresponding to television viewing device 115. Regardless of the source, such requests may include, e.g., a listing of categories of commerce channels, a listing of virtual channels and/or logical channel numbers corresponding to respective commerce channel categories, a listing of categories of virtual channels and/or logical channel numbers, etc. Block 605 may be followed by block 610.

Block 610 (Transmit Categories) may refer to category transmitter 230 transmitting or broadcasting, to requesting television viewing device 115, the requested listing of categories of commerce channels, virtual channels, logical channel numbers, etc., in response to the request. Block 610 may be followed by block 615.

Block 615 (Received Selected Category) may refer to matching information manager 215, request receiver 225, and/or channel broadcaster 220 receiving a selected category of commerce channel content from requesting television viewing device 115. The received category may be stored in a memory corresponding to commerce channel server 110, in a database corresponding to the subscriber or subscribing household. Block 615 may be followed by block 620.

Block 620 (Broadcast Logical Channel) may refer to channel broadcaster 220 transmitting or broadcasting programming content corresponding to the matched category from commerce channel server 110 to television viewing device 115, via network 105.

Figure 7:
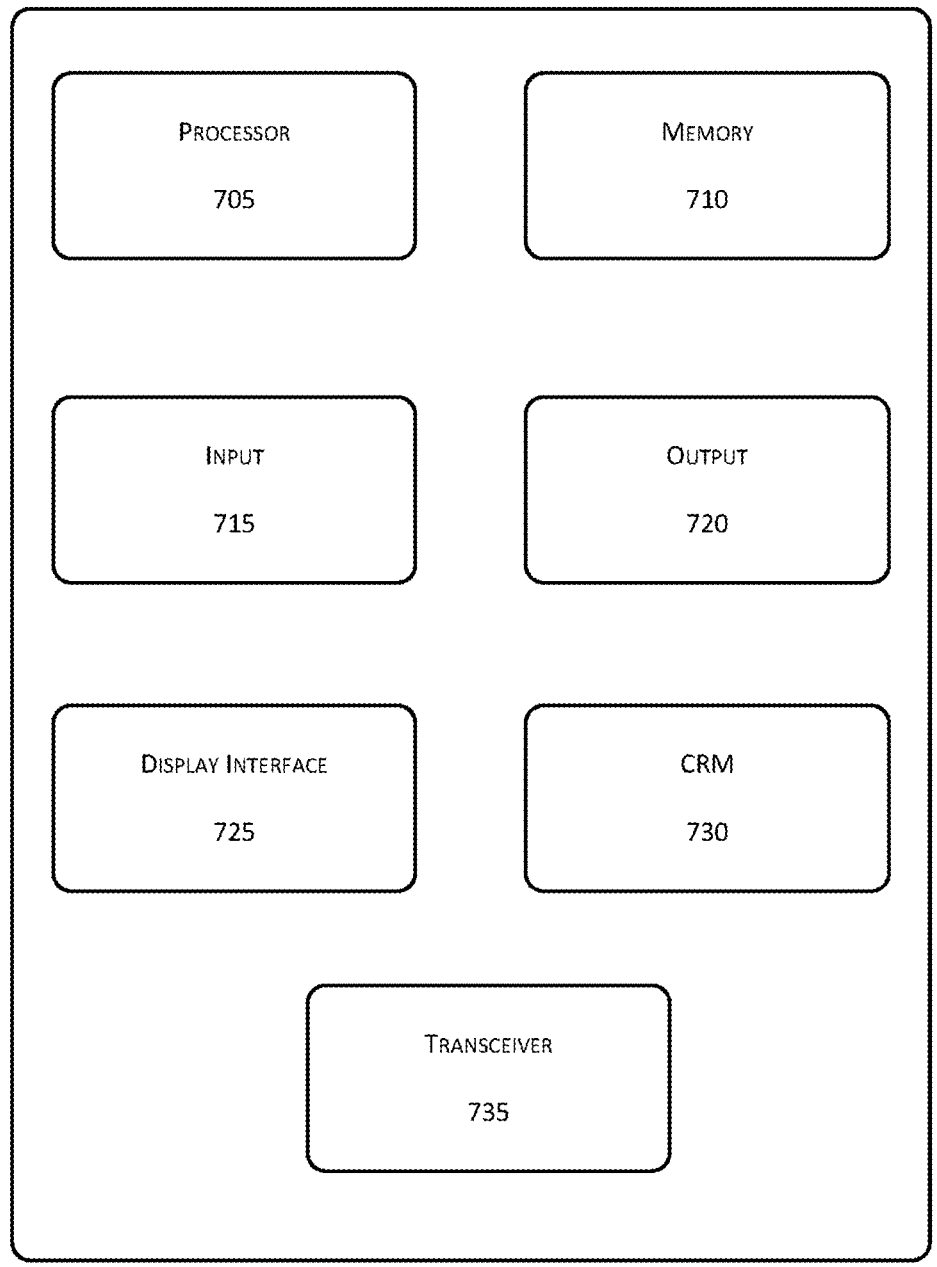
FIG. 7 shows an example computing device on which and by which at least portions of profile-based content variation may be implemented, arranged in accordance with one or more embodiments described herein.

FIG. 7 shows an illustrative computing embodiment, in which any of the processes and sub-processes of profile-based content variation may be implemented as computer-readable instructions stored on a computer-readable medium. The computer-readable instructions may, for example, be executed by a processor of any one of commerce channel commerce channel server 110 and/or television viewing device 115, as referenced herein, having a network element and/or any other device corresponding thereto, particularly as applicable to the applications and/or programs described above corresponding to the configuration 100 for profile-based content variation.

In a very basic configuration, a computing device 700 may typically include, at least, one or more processors 705 and a system memory 710. Computing device 500 may also include one or more input components 715, one or more output components 720, a display component 725, a computer-readable medium 730, and a transceiver 735.

Processor(s) 705 may refer to, e.g., a microprocessor, a microcontroller, a digital signal processor, or any combination thereof.

Memory 710 may refer to, e.g., a volatile memory, non-volatile memory, or any combination thereof. Memory 710 may store, therein, an operating system, an application, and/or program data. That is, memory 710 may store executable instructions to implement any of the functions or operations described above and, therefore, memory 710 may be regarded as a computer-readable medium.

Input component 715 may refer to a built-in or communicatively coupled keyboard, touch screen, or telecommunication device. Further, an input component, if not built-in to computing device 700, may be communicatively coupled thereto via short-range communication protocols including, but not limited to, radio frequency or Bluetooth.

Output component 720 may refer to a component or module, which may be built-in or removable from computing device 700, which is configured to output data to an external device.

Display component 725 may refer to, e.g., a solid state display that may have touch input capabilities. That is, a display component may include capabilities that may be shared with or replace those of the aforementioned input components.

Computer-readable medium 730 may refer to a separable machine readable medium that is configured to store one or more programs that embody any of the functions or operations described above. That is, a computer-readable medium, which may be received into or otherwise connected to a drive component of computing device 700, may store executable instructions to implement any of the functions or operations described above. These instructions may be complimentary or otherwise independent of those stored by memory 710.

Transceiver 735 may refer to a network communication link for computing device 700, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method of providing profile-based content variation, comprising:
    determining viewing trends for a television viewing device based on subscriber information and channel selection history of the television viewing device;
    matching one of a plurality of commerce channels with multiple logical channels based on the determined viewing trends;
    broadcasting, to the television viewing device, one of the multiple logical channels that is matched to one of the commerce channels that is selected based on information regarding matches between one of the plurality of commerce channels to the multiple logical channels;
    updating the determined viewing trends; and
    updating the multiple logical channels matched with the one of the commerce channels based on the updated viewing trends.

2. The method of claim 1, further comprising:
    transmitting a plurality of categories of commerce channels to the television viewing device;
    receiving a selected one of the plurality of categories from the television viewing device; and
    transmitting at least one of the commerce channels corresponding to the selected category.

3. The method of claim 2, wherein an order of the at least one commerce channels corresponding to the selected category is updated based on the determined viewing trends.

4. The method of claim 1, further comprising:
    transmitting a plurality of categories of commerce channels to the television viewing device;
    receiving a selected one of the plurality of categories from the television viewing device; and
    broadcasting one of the multiple logical channels that is matched one of the commerce channels corresponding to the selected category.

5. The method of claim 1, wherein the subscriber information includes at least one of an age, a residential location, and a gender of a corresponding subscriber.

6. The method of claim 1, wherein the channel selection history includes at least one of viewing hours for respective ones of the commerce channels and purchases made from the television viewing device.

7. The method of claim 1, further comprising:
    transmitting information regarding matches between one of the plurality of commerce channels to the multiple logical channels to the television viewing device.

8. The method of claim 1, wherein the viewing trends for the television viewing device are determined periodically, and information regarding matches between one of the plurality of commerce channels to the multiple logical channels is updated in real time or periodically based on the periodically determined viewing trends for the television viewing device.

9. A commerce channel server, comprising:
a viewing trend analyzer configured to determine viewing trends for a television viewing device based on subscriber information and channel selection history of the television viewing device;
a matching information manager configured to match one of a plurality of commerce channels to multiple logical channels based on the determined viewing trends; and
a channel broadcaster configured to broadcast, to the television viewing device, one of the multiple logical channels that is matched to one of the commerce channels that is selected based on information regarding matches between one of the plurality of commerce channels to the multiple logical channels,
wherein the viewing trend analyzer is further configured to update the determined viewing trends, and
the matching information manager is further configured to update the multiple logical channels matched with the one of the commerce channels based on the updated viewing trends.

10. The server of claim 9, further comprising:
a category transmitter configured to transmit a plurality of categories of the commerce channels to the television viewing device.

11. The server of claim 9, further comprising:
a matching information transmitter configured to transmit information regarding matches between one of the plurality of commerce channels to the multiple logical channels to the television viewing device.

12. A commerce channel system, comprising:
a commerce channel server; and
a television viewing device,
wherein the commerce channel server comprises:
a viewing trend analyzer configured to determine viewing trends for a television viewing device based on subscriber information and channel selection history of the television viewing device,
a matching information manager configured to match one of the plurality of commerce channels with multiple logical channels based on the determined viewing, and
a channel broadcaster configured to broadcast, to the television viewing device, one of the multiple logical channels that is matched to one of the commerce channels that is selected based on information regarding matches between one of the plurality of commerce channels to the multiple logical channels; and
wherein the television viewing device comprises:
an input receiver configured to input to select a commerce channel from among the plurality of commerce channels,
a transmitter configured to transmit content for the selected commerce channel to the commerce channel server, and
a channel receiver configured to receive, from the commerce channel server, at least one of the multiple logical channels that is matched with the selected commerce channel,
wherein the viewing trend analyzer is further configured to update the determined viewing trends, and
the matching information manager is further configured to update the multiple logical channels matched with the one of the commerce channels based on the updated viewing trends.

13. The system of claim 12, wherein the commerce channel server further comprises:
a category transmitter configured to transmit a plurality of categories of the commerce channels to the television viewing device;
a category receiver configured to receive a selected one of the categories;
a channel transmitter configured to transmit content corresponding to at least one commerce channel corresponding to the selected category; and
a channel receiver configured to receive the content corresponding to the transmitted commerce channel.

14. The system of claim 12, wherein the commerce channel server further comprises:
a category transmitter configured to transmit the plurality of the categories of the commerce channels to the television viewing device; and
a category receiver configured to receive a selected one of the categories,
wherein the channel broadcaster is configured to broadcast one of the multiple logical channels that is matched to the commerce channel corresponding to the selected category.

15. The system of claim 12, wherein the subscriber information includes at least one of an age, a residential location, and gender of a corresponding subscriber.

16. The system of claim 12, wherein the channel selection history includes at least one of viewing hours for respective ones of the commerce channels and purchases made from the television viewing device.

17. The system of claim 12, wherein the commerce channel server further comprises:
a matching information transmitter configured to transmit the matching information to the television viewing device.

18. The system of claim 12,
wherein the viewing trend analyzer is further configured to determine the viewing trends for the television viewing device periodically, and
wherein the matching information manager is further configured to update the information regarding matches between one of the plurality of commerce channels to multiple logical channels in real time or periodically based on the periodically determined viewing trends for the television viewing device.

* * * * *